Oct. 17, 1967  E. T. SCHONHOLZER  3,348,129

APPARATUS FOR PRODUCING PHASE-SHIFTABLE PULSES

Filed June 19, 1964

INVENTOR
Emil T. Schonholzer

ATTORNEY

United States Patent Office 3,348,129
Patented Oct. 17, 1967

3,348,129
APPARATUS FOR PRODUCING PHASE-SHIFTABLE PULSES
Emil T. Schonholzer, Depew, N.Y., assignor to Westinghouse Electric Corporation, Pittsburgh, Pa., a corporation of Pennsylvania
Filed June 19, 1964, Ser. No. 376,422
13 Claims. (Cl. 323—22)

ABSTRACT OF THE DISCLOSURE

The apparatus shown is a gating circuit for controlled valves and includes a signal-controlled, AC-powered, flux reset magnetic amplifier whose output is supplied to a saturating transformer that generates firing pulses for the valves on one half wave or the setting half cycle of the AC supply to the amplifier. Voltage derived from the AC supply applies a continuous bias to the transformer in its reset direction to reset the transformer magnetic condition over a long time relative to the "setting time. A full-wave version is also disclosed.

This invention relates to gating circuits for gate controlled valves and especially for solid state gate controlled valves.

In some gate controlled valves such as controlled rectifiers, the gate exercises control only to initiate conduction. Examples of controlled rectifiers are thyratrons and solid state controlled rectifiers such as silicon controlled rectifiers. In another type of gate controlled valve the gate may exercise control for both turn-on (initiate conduction) and turn-off (end conduction).

The present invention is directed to a simple, relatively inexpensive and highly efficient gating circuit for controlling the gating or firing angle of a gate controlled device. The firing angle is the phase angle or time relative to a reference wave when conduction of the valve is initiated.

Accordingly, it is an object of the present invention to provide a novel gating circuit for gate controlled valves.

Another object of the invention is to provide a novel apparatus for producing and controlling the timing of periodic pulses.

Another object is to provide a novel gating circuit for supplying phase adjustable periodic gating signals to a gate controlled valve.

A further object is to provide a relatively simple and economical gating circuit for supplying signal-responsive phase adjustable gating pulses to a gate controlled valve.

The above advantages may be realized in a system built in accordance with one embodiment of the invention wherein the output of a signal-controlled flux reset magnetic amplifier is supplied to a saturating transformer which generates firing pulses on one half wave or the setting half cycle of the alternating current supply to the amplifier, and which transformer is continuously biased in its reset direction by a voltage (low compared to the setting voltage) derived from said alternating current supply, whereby the transformer is reset over a long period relative to the "setting" period. The transformer reset voltage, which relative to the magnetic amplifier is in the same direction as the input control signal to the amplifier, is kept at or below the threshold value of diodes in the amplifier to prevent interference with the signal-controlled flux reset of the amplifier and to avoid overloading the signal source. The long reset time causes the saturating transformer to apply a back biasing voltage to the valve gate over an extended portion of the firing pulse period.

Other and further advantages of the invention will be found in the following detailed description taken in conjunction with the drawings wherein a preferred embodiment of the invention is illustrated.

Figure 1:
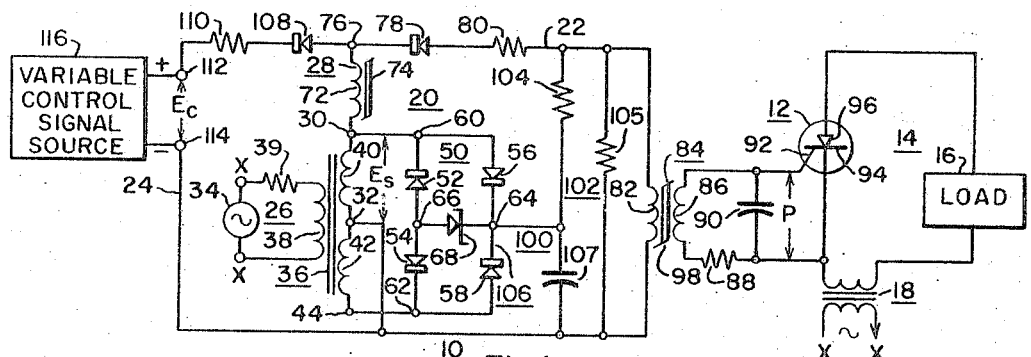
Figure 2:
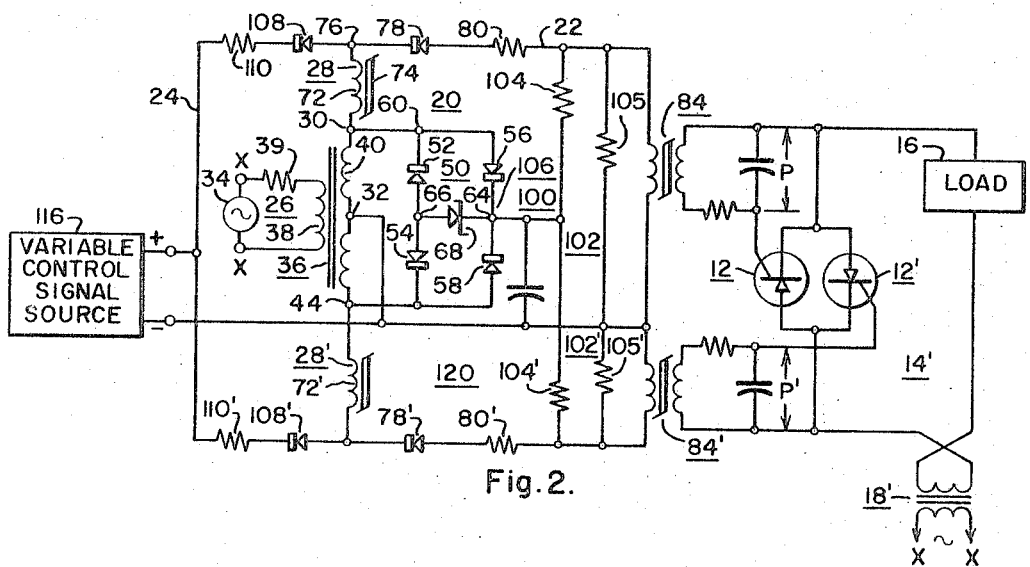
Figure 3:
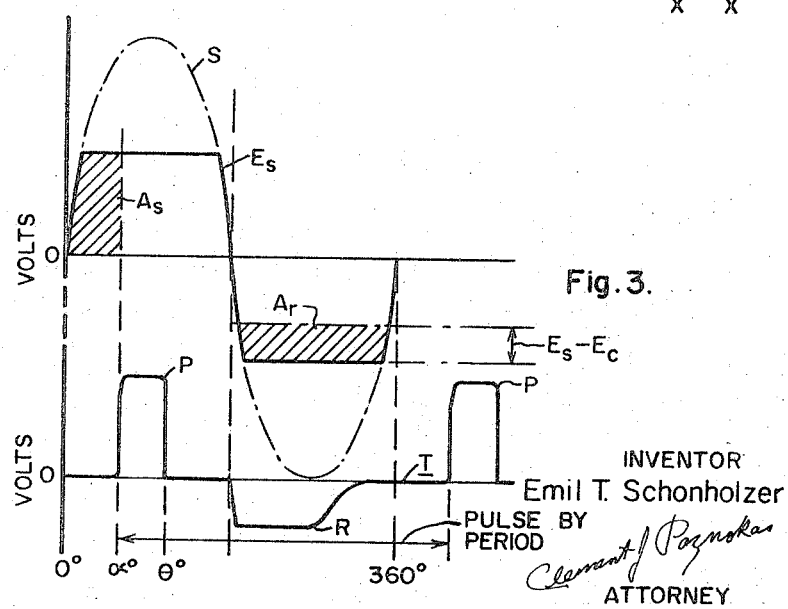

In the drawings, FIGURE 1 is a diagram illustrating a half wave embodiment of the invention for supplying a firing pulse during each half cycle of one polarity of an alternating current supply;

FIG. 2 is a diagram illustrating a full wave embodiment of the invention for supplying isolated firing pulses on each half cycle of an alternating current supply; and FIG. 3 is a chart showing wave forms in various parts of the circuit.

The firing circuit 10 of FIG. 1 is referred to as a half wave circuit because it supplies firing or gating pulses to a controlled valve 12 in a load circuit 14 on every other half cycle of alternating current power energizing the gating circuit 10. Included in the load circuit 14 is the controlled valve 12, a load 16, and a source of AC (alternating current) 18. Valve 12 is shown as a semi-conductor controlled rectifier by way of example. Although the firing circuit 10 may be employed to control any gated electric valve, it is particularly advantageous in combination with gated solid state valves, for example the silicon controlled rectifier shown.

The firing circuit 10 includes a flux reset type magnetic amplifier 20 having a load branch 22 and a control branch 24. The respective branches are energized on opposite half cycles of a common AC supply circuit 26 to apply oppositely sensed magnetizing forces during alternate half cycles of the AC to a saturable reactor 28. Branches 22 and 24 are connected across a series circuit including reactor 28 and output terminals 30 and 32 of the AC supply source 26.

The power supply circuit 26 includes input terminals X—X connected to a suitable source 34 of alternating current. By way of example the AC supply circuit 26 is shown as including a transformer 36 having an input or primary winding 38 and a center-tapped secondary or output winding having sections 40 and 42 on opposite sides of the center tap 32. The input winding 38 is connected through a dropping resistor 39 to the source 34. The lower end of winding section 42 is connected to a terminal 44. Branches 22 and 24 are energized from the upper secondary section 40 through terminals 30 and 32. The input of transformer 18 is also connected to the AC source 34 through terminals X—X.

Preferably branches 22 and 24 are energized with alternating polarity square wave voltage to assure substantially uniform magnitude output pulses. In order to supply alternating polarity square waves to the amplifier 20, a limiter circuit 50 is effectively connected across the alternating current supply for the branches 22 and 24 to clip the AC waves. More specifically, the clipper circuit 50 includes a full wave bridge type rectifier formed by diodes 52, 54, 56 and 58, and having AC input terminals 60 and 62 connected to AC output terminals 30 and 44 of the AC supply circuit 26. The DC (direct current) output diagonal of the bridge 50 includes DC output terminals 64 and 66 and a voltage threshold device 68 for example a Zener diode connected between terminals 64 and 66. The AC waves are limited clipped at the threshold voltage value of the threshold device. In the case of a Zener diode, the clipping takes place at the Zener knee or breakdown voltage value. The clipping action is applied to the full secondary 40–42 on each half cycle. This is of particular advantage because of the poor regulation encountered in small transformers. The clipped AC voltage $E_s$ at the AS output terminals 30 and 32, is shown at $E_s$ in FIG. 3, the sine wave projection which would occur without the limiter being shown in dot-dash at S.

Reactor 28 has a winding 72 inductively coupled with a magnetically saturable core 74. The core is preferably made of "square loop" magnetic material, that is, magnetic material having a substantially rectangular or parallelogram shaped hysteresis loop to provide sharp saturating characteristics. The upper end of winding 72 is connected to a junction 76, while the lower end is connected to AC supply terminal 30.

Load branch 22 which is connected between junction 76 and AC supply terminal 32, includes in series an asymmetric unidirectional current device 78 such as a diode or rectifier, a resistor 80, and the input (primary) winding 82 of a saturating transformer 84. The output (secondary) winding 86 of this transformer is connected through a resistance (88) capacitance (90) network to the control input of valve 12. This network improves the $dv/dt$ capability of the valve. More specifically the output winding is connected to the control electrode 92 and the power outlet electrode 94 of the valve. The power inlet electrode of the valve is indicated at 96. In the case of a controlled rectifier, the control, power inlet, and power outlet electrodes, are referred to as gate, anode and cathode electrodes, respectively. Transformer 84 has a magnetically saturable core 98 with which windings 82 and 86 are inductively coupled. Core 98 is preferably made of "square loop" magnetic material.

Transformer 84, which is saturable on half cycles of one polarity of the AC supply, is reset on the opposite half cycles of the AC, by a rectified voltage derived from the AC supply 26 through a reset circuit 100 and applied as a continuous bias to the transformer.

The reset circuit 100 includes a voltage divider 102, formed by series connected resistors 104 and 105, and connected across the D.C. output terminals 32 and 64 of a full wave center-tapped rectifier arrangement 106 formed by secondary windings 40 and 42, and diodes 56 and 58. A filter condenser 107 is connected across the D.C. output from terminals 32 and 64. The D.C. across resistor 105 derived from the rectifier 106 is applied to the transformer input winding 82 to provide a continuous magnetic bias in the reset direction.

The control branch 24, which is connected between junction 76 and AC supply terminal 32, includes in series an asymmetric current device 108 such as a diode or rectifier, a resistor 110, and a control input circuit including input signal terminals 112 and 114 for receiving control signals, for example from a low impedance source 116 of variable magnitude D.C. control signals.

The operation of the firing circuit 10 may be understood from the following explanation. It will be noted that diodes 78 and 108 are oppositely related to each other with respect to the alternating polarity square wave voltage $E_s$ applied to the branches 22 and 24. Thus branches 22 and 24 can conduct only on opposite half cycles of the applied AC voltage $E_s$. For convenience, that half cycle of the applied AC voltage $E_s$ which forward biases diode 78 and renders branch 22 conductive will be referred to as the positive half cycle of $E_s$. As a corollary, diode 108 is forward biased and branch 24 is rendered conductive by the negative half cycle of $E_s$. Branch 22, when conductive, drives the cores 74 and 98 toward saturation of a particular polarity or sense, which for convenience is referred to as positive saturation. Continuing with the same convention, branch 24, when conductive, drives core 74 toward negative saturation. During the conductive half cycle of branch 24 the AC half cycle applied to the branch is opposed by the control signal voltage $E_c$ supplied by source 116.

Transformer core 98 is subjected to a continuous magnetic bias in the reset direction by the bias circuit 100. The D.C. bias voltage developed across resistor 105 is for example about one-fourth the magnitude of the half cycle of the alternating polarity square wave voltage applied to the transformer input and derived from the AC voltage $E_s$.

Continuing now with the description of an example of operation, assume first that the control voltage $E_c$ is set to zero. Just prior to the start of a positive half cycle of the applied AC voltage $E_s$, reactor core 74 is in a reset state at a particular flux level far below positive saturation, and the transformer core 98 is in a reset state at the bias flux level determined by the bias circuit 100, and which is below positive saturation. With zero control voltage $E_c$, reactor 28 is capable of absorbing the full positive half cycle of the applied AC voltage $E_s$, so that as the voltage $E_s$ swings through its positive half cycle, reactor 28 is driven toward but not quite to positive saturation. As a result the effective impedance of reactor 28 is high and transformer 84 produces no output. On the next or negative half cycles of the AC voltage $E_s$, diode 108 is forward biased while diode 78 is back biased. During this, the conducting half cycle of branch 24, reactor 28 is driven toward negative magnetic saturation to reset its core at the previous reset flux level. The set and reset flux areas are shown at $A_s$ and $A_r$ respectively, in FIG. 3. The vertical height of area $A_r$ is substantially $E_s - E_c$.

The cycle is repeated with no output from transformer 84 as long as the control signal voltage $E_c$ is maintained at zero. However, when the control signal source 116 is adjusted to raise control voltage $E_c$ to some positive value, the negative half cycle of the applied AC voltage $E_s$ is opposed by the voltage $E_c$, thus reducing the reset action or drive toward negative saturation during the reset or negative half cycle of the AC voltage $E_s$. This resets reactor core 74 to a flux level closer to positive saturation. As a consequence, on the next positive or setting half cycle of the AC voltage $E_s$, reactor 28 is driven to positive saturation at a firing angle $\alpha$ whose value depends on the magnitude of the control voltage $E_c$.

Once reactor core 74 is saturated, the effective impedance of the reactor is suddenly reduced allowing substantial current to flow through branch 22 and applying a substantial voltage across the transformer input winding 82. This in turn induces in transformer output winding 86 a voltage pulse P of sufficient magnitude, duration and steepness, to fire the valve 12, which is forward biased at this time by reason of the phase relation of source 18 to the AC voltage $E_s$. The firing pulse generated by transformer 84 is indicated at P on the output curve T (FIG. 3) of transformer 84. The pulse P is initiated when reactor 28 is fired (angle $\alpha$) and terminates when transformer 84 saturates (angle $\theta$).

During the negative half cycle of the AC voltage $E_s$, the reactor 28 resets to a flux level dependent on the value of the control signal $E_c$. During the same half cycle, reset of transformer 84 is initiated by removal of the setting voltage and continued by the constant negative magnetic bias due to the D.C. voltage supplied by the reset circuit 100. The transformer output voltage developed on reset is illustrated in FIG. 3 by the negative portion R of the transformer 84 output curve T. Since the D.C. reset bias voltage applied to the transformer input 82 is low, the transformer output developed on reset is too low to injure the gate-cathode junction of the valve 12. The circuit keeps recycling to provide an output pulse during each positive half cycle of the AC voltage $E_s$, the pulse having a phase angle or position in time dependent on the magnitude of the control voltage $E_c$ supplied by the control signal source 116. The phase angle of the pulse is adjustable by adjusting the magnitude of the control voltage $E_c$. By way of example the apparatus components may have the following values:

| | | |
|---|---|---|
| AC source 34 | volts | 115 |
| Transformer 36: | | |
|     Primary 38 to Secondary 40 | ratio | 2:1 |
|     Primary 38 to Secondary 42 | do | 2:1 |
| Zener diode 68 | | (1) |
| Capacitor 90 | mfd | .22 |
| Capacitor 107 | do | 200 |
| Resistor 39 | ohms | 500 |
| Resistor 80 | do | 22 |
| Resistor 88 | do | 15 |
| Resistor 104 | kilohms | 1.2 |
| Resistor 105 | do | 1 |
| Resistor 110 | ohms | 180 |

[1] 10 v. Zener threshold voltage.

Resistor 39 absorbs the voltage above the clipping line. Resistor 80 limits the current to a safe value when transformer 84 fires. Resistor 110 limits current and also prevents negative saturation of reactor 28 in response to negative control signals. The bias circuit 100 is designed to develop a D.C. voltage across resistor 105 that is no greater than the combined forward threshold voltages of diodes 78 and 108. This is done for the following reasons: Any voltage in excess of the sum of the diode threshold values acts as a bias in the same direction as the positive control signal $E_c$ at high firing angles of the reactor 28, thus preventing complete reset of the reactor. Additionally, source 116 may be dangerously loaded. The low bias voltage also limits the transformer output voltage on transformer reset to a low value thus to protect the gate circuit of valve 12. The bias provided by the reset circuit 100 is maintained during both half cycles of the AC in order to prevent the formation of unwanted or spurious pulses in the transformer output winding 86 by flux changes which occur if the reset bias were removed. Such unwanted pulses would be in the direction to fire valve 12.

In the full wave circuit of FIG. 2 corresponding parts have the same reference numerals as parts in FIG. 1. In addition, a circuit 120 which operates to provide an output pulse on the opposite half cycle of the supply 26 is connected in parallel with the circuit of FIG. 1. This circuit includes similar components as in FIG. 1, and bearing the same reference numerals, modified however by a prime mark. Thus components bearing the same reference numerals, unprimed and primed, have corresponding functions. In FIG. 2, reactor 28 is set and reactor 28′ is reset on the same half cycle, and on the next half cycle reactor 28 is reset while reactor 28′ is set, etc. Likewise, transformer 84 delivers a firing pulse P to valve 12 on one half cycle, while transformer 84′ delivers a firing pulse P′ to valve 12′ on the next half cycle, etc. Load circuit 14′ includes back-to-back connected valves 12 and 12′ in series with the load 16 and source 18.

It is to be understood that the herein-described arrangements are simply illustrative of the principles of the invention, and that other embodiments and applications are within the spirit and scope of the invention.

I claim as my invention:

1. A pulse forming circuit comprising: alternating current power supply means having first and second alternating current terminals; saturable core means; a winding inductively coupled to said core means; means connecting one end of said winding to said first terminal; a saturable transformer having input means and output means; a load branch connected between the other end of said winding and said second terminal, said load branch including in series a first asymmetric current conducting device and said transformer input means, said first asymmetric device being poled to conduct during a particular half cycle of said alternating current, said load branch being adapted during said particular half cycle of said alternating current to set said core means to magnetic saturation in one sense and after a predetermined interval to set said transformer to magnetic saturation in a particular sense to produce in said transformer output means a pulse which is initiated by said core means saturation and is ended by said transformer saturation; a control branch connected between the other end of said winding and said second terminal, said control branch including in series a second asymmetric current conducting device and a control signal source, said second asymmetric device being poled to conduct during the opposite half cycle of said alternating current, said control signal source being adapted to supply control signals of opposite polarity relative to said opposite half cycles of said alternating current, said control branch being adapted during said opposite half cycles of said alternating current to reset said core means to a flux level dependent on the value of said control signal; and bias means operably connected to said alternating current power supply means for applying to said transformer during both said half cycles of said alternating current a magnetic bias in the reset direction to reset said transformer, said bias means comprising means for supplying a direct current voltage component across said transformer input means oppositely poled relative to voltage applied across said transformer input means due to said particular half cycles of alternating current, said direct current voltage component supplied by said bias means to said transformer input means being not greater than the combined forward threshold voltage values of said asymmetric current devices.

2. The combination as in claim 1 and further including a circuit having a controlled valve with a control electrode, and means coupling said transformer output means to said control electrode.

3. A pulse forming circuit comprising: alternating current power supply means having first and second alternating current terminals; saturable core means; a winding inductively coupled to said core means; means connecting one end of said winding to said first terminal; a saturable transformer having input means and output means; a load branch connected between the other end of said winding and said second terminal, said load branch including in series a first asymmetric current conducting device and said transformer input means, said first asymmetric device being poled to conduct during a particular half cycle of said alternating current, said load branch being adapted during said particular half cycle of said alternating current to set said core means to magnetic saturation in one sense and after a predetermined interval to set said transformer to magnetic saturation in a particular sense to produce in said transformer output means a pulse which is initiated by said coremeans saturation and is ended by said transformer saturation; a control branch connected between the other end of said winding and said second terminal, said control branch including in series a second asymmetric current conducting device and a control signal source, said second asymmetric device being poled to conduct during the opposite half cycle of said alternating current, said control signal source being adapted to supply control signals of opposite polarity relative to said opposite half cycles of said alternating current, said control branch being adapted during said opposite half cycles of said alternating current to reset said core means to a flux level dependent on the value of said control signal; and bias means for applying to said transformer during both half cycles of said alternating current a magnetic bias in the reset direction to reset said transformer, said bias means comprising means including alternating current to direct current full wave rectifier means for supplying a direct current voltage component across said transformer input means oppositely poled negative to voltage applied across said transformer input means due to said particular half cycles of alternating current, said rectifier means having an input energized from said alternating current supply means.

4. The combination as in claim 3 and further including a voltage threshold device connected across a direct current output of said rectifier means to clip the alternating current waves supplied to said branches.

5. The combination as in claim 3 and further including a circuit having a controlled valve with a control electrode, and means coupling said transformer output means to said control electrode.

6. The combination as in claim 3 wherein said direct current voltage component supplied by said bias means to said transformer input means is not more than the combined forward threshold voltage values of said asymmetric current devices.

7. A pulse forming circuit comprising: alternating current power supply means having first and second alternating current terminals; saturable core means; a winding inductively coupled to said core means; means connecting one end of said winding to said first alternating current terminal; a saturable transformer having input means and output means; a load branch connected between the other end of said winding and said second terminal, said load branch including in series a first asymmetric current conducting device and said transformer input means, said first asymmetric device being poled to conduct during a particular half cycle of said alternating current, said load branch being adapted during said particular half cycle of said alternating current to set said core means to magnetic saturation in one sense and after a predetermined interval to set said transformer to magnetic saturation in a particular sense to produce in said transformer output means a pulse which is initiated by said core means saturation and is ended by said transformer saturation; a control branch connected between the other end of said winding and said second terminal, said control branch including in series a second asymmetric current conducting device and a control signal source, said second asymmetric device being poled to conduct during the opposite half cycle of said alternating current, said control signal source being adapted to supply control signals of opposite polarity relative to said opposite half cycles of said alternating current, said control branch being adapted during said opposite half cycles of said alternating current to reset said core means to a flux level dependent on the value of said control signal; and bias means for applying to said transformer during both half cycles of said alternating current a magnetic bias in the reset direction to reset said transformer, said bias means including a voltage divider and alternating current to direct current full wave rectifying means connected to apply a direct current voltage across said voltage divider, said voltage divider having in series a plurality of impedance sections, one of said sections being connected across said transformer input means to supply a direct current voltage component across said transformer in the reset direction, said rectifying means being energized from said alternating current power supply means.

8. The combination as in claim 7 and further including a voltage threshold device connected across a direct current output of said rectifying means to clip the alternating current waves supplied to said branches.

9. The combination as in claim 7 and further including a circuit having a controlled valve with a control electrode, and means coupling said transformer output means to said control electrode, whereby said valve is fired by said pulse.

10. The combination as in claim 7 wherein said direct current voltage component supplied by said bias means to said transformer input means is not more than the sum of the forward threshold voltage values of said asymmetric current devices.

11. A pulse forming circuit comprising: alternating current power supply means having first and second alternating current terminals and an intermediate terminal having a potential intermediate of the respective potentials of said first and second alternating current terminals; saturable core means, a winding inductively coupled to said core means, means connecting one end of said winding to said first alternating current terminal, a saturable transformer having input means and output means, a load branch connected between the other end of said winding and said intermediate terminal, said load branch including in series a first asymmetric current conducting device and said transformer input means, said first asymmetric device being poled to conduct during a particular half cycle of said alternating current, said load branch being adapted during said particular half cycle of said alternating current to set said core means to magnetic saturation in one sense and after a predetermined interval to set said transformer to magnetic saturation in a particular sense to produce in said transformer output means a pulse which is initiated by said core means saturation and is ended by said transformer saturation; a control branch connected between the other end of said winding and said intermediate terminal, said control branch including in series a second asymmetric current conducting device and a control signal source, said second asymmetric device being poled to conduct during the opposite half cycle of said alternating current, said control signal source being adapted to supply control signals of opposite half cycles of said alternating current, said control branch being adapted during said opposite half cycles of said alternating current to reset said core means to a flux level dependent on the value of said control signal; a first full wave rectifier having four diode branches connected in bridge configuration having alternating current input terminals and first and second direct current output terminals, said rectifier input terminals being connected to said first and second alternating current terminals of said alternating current supply means; a voltage threshold device connected across said rectifier direct current output terminals for clipping the alternating current applied to said load and control branches; and a voltage divider having a plurality of series connected resistance sections, one of said resistance sections being connected across said transformer input means, one end of said voltage divider being connected to said intermediate alternating current terminal, the other end of said voltage divider being connected to one of said rectifier direct output terminals, whereby said voltage divider is supplied with full wave direct current voltage by a center-tapped second full wave rectifier arrangement and the resulting voltage drop across said one resistance section is in the reset direction with respect to said transformer.

12. The combination as in claim 11 and further including a circuit having a controlled valve with a controlled electrode, and means coupling said transformer output means to said control electrode, whereby said valve is gated by said transformer output pulse.

13. The combination as in claim 11 wherein said voltage drop is not greater than the sum of the forward threshold voltage values of said asymmetric current devices.

References Cited

UNITED STATES PATENTS

| | | | |
|---|---|---|---|
| 3,113,198 | 12/1963 | Shinn | 219—20 |
| 3,128,422 | 4/1964 | Brown | 323—34 |
| 3,142,781 | 7/1964 | Izenour | 323—22 |
| 3,193,725 | 7/1965 | Skirpan | 323—22 |
| 3,202,871 | 8/1965 | Shelar | 323—22 |
| 3,223,922 | 12/1965 | Borden | 323—22 |
| 3,252,077 | 5/1966 | Schonholzer et al. | 323—24 |
| 3,290,555 | 12/1966 | Davis | 323—22 |

JOHN F. COUCH, *Primary Examiner.*

M. WACHTELL, *Assistant Examiner.*